United States Patent
Schwarz et al.

(10) Patent No.: US 10,570,824 B2
(45) Date of Patent: Feb. 25, 2020

(54) NEAR ZERO VELOCITY LUBRICATION SYSTEM FOR A TURBINE ENGINE

(71) Applicant: United Technologies Corporation, Hartford, CT (US)

(72) Inventors: Frederick M. Schwarz, Glastonbury, CT (US); Michael E. McCune, Colchester, CT (US)

(73) Assignee: United Technologies Corporation, Farmington, CT (US)

( * ) Notice: Subject to any disclaimer, the term of this patent is extended or adjusted under 35 U.S.C. 154(b) by 564 days.

(21) Appl. No.: 14/949,273

(22) Filed: Nov. 23, 2015

(65) Prior Publication Data
US 2017/0145920 A1    May 25, 2017

(51) Int. Cl.
| | |
|---|---|
| F02C 7/06 | (2006.01) |
| F01D 15/08 | (2006.01) |
| F01D 15/12 | (2006.01) |
| F01D 25/20 | (2006.01) |
| F01D 21/14 | (2006.01) |

(52) U.S. Cl.
CPC .............. *F02C 7/06* (2013.01); *F01D 15/08* (2013.01); *F01D 15/12* (2013.01); *F01D 21/14* (2013.01); *F01D 25/20* (2013.01); *F05D 2220/323* (2013.01); *F05D 2260/98* (2013.01)

(58) Field of Classification Search
CPC . F02C 7/06; F01D 25/18; F01D 25/20; F01D 15/12; F01D 15/08; F01D 21/14; F05D 2260/98; F16H 57/045; F16H 57/0441
See application file for complete search history.

(56) References Cited

U.S. PATENT DOCUMENTS

| | | | | |
|---|---|---|---|---|
| 3,797,561 | A | * | 3/1974 | Clark ...................... F01D 25/18 165/51 |
| 4,887,424 | A | | 12/1989 | Geidel et al. |
| 4,922,119 | A | * | 5/1990 | Raad ...................... B64D 33/00 290/31 |
| 5,791,781 | A | | 8/1998 | Park et al. |
| 7,805,947 | B2 | * | 10/2010 | Moulebhar ........... F01D 21/003 60/39.163 |
| 8,192,143 | B2 | * | 6/2012 | Suciu ..................... F01D 25/18 415/108 |
| 8,230,974 | B2 | | 7/2012 | Parnin |

(Continued)

FOREIGN PATENT DOCUMENTS

JP           2009162250 A    7/2009

OTHER PUBLICATIONS

EP search report for EP16199918.0 dated Apr. 12, 2017.

*Primary Examiner* — Carlos A Rivera
(74) *Attorney, Agent, or Firm* — Getz Balich LLC

(57) ABSTRACT

A system is provided for a turbine engine. This turbine engine system includes a rotating assembly, a bearing and a lubrication system. The bearing is configured with the rotating assembly. The lubrication system is configured to lubricate the bearing. The lubrication system includes a lubricant pump and a lubricant reservoir. The lubricant pump is mechanically coupled with and driven by the rotating assembly. The lubricant pump is configured with the lubricant reservoir so as to be at least partially submersed in lubricant contained within the lubricant reservoir.

20 Claims, 7 Drawing Sheets

(56) References Cited

U.S. PATENT DOCUMENTS

| | | | |
|---|---|---|---|
| 8,312,969 B2 * | 11/2012 | Hoang | F01D 25/20 |
| | | | 184/6.11 |
| 8,381,878 B2 | 2/2013 | DiBenedetto | |
| 8,627,667 B2 * | 1/2014 | Lozier | B64D 37/04 |
| | | | 60/267 |
| 8,702,373 B1 | 4/2014 | Valva et al. | |
| 8,893,469 B2 | 11/2014 | DiBenedetto et al. | |
| 8,966,876 B2 | 3/2015 | Suciu et al. | |
| 8,978,352 B2 | 3/2015 | Suciu et al. | |
| 9,945,252 B2 * | 4/2018 | Snape | F01D 25/18 |
| 2006/0042223 A1 * | 3/2006 | Walker | F01D 9/065 |
| | | | 60/39.08 |
| 2006/0090964 A1 | 5/2006 | Hoang et al. | |
| 2009/0000308 A1 * | 1/2009 | Cloft | F02C 7/32 |
| | | | 60/802 |
| 2010/0326048 A1 * | 12/2010 | Lozier | B64D 37/04 |
| | | | 60/262 |
| 2011/0108360 A1 | 5/2011 | DiBenedetto | |
| 2013/0098057 A1 * | 4/2013 | Suciu | F02C 9/16 |
| | | | 60/779 |
| 2013/0098059 A1 * | 4/2013 | Suciu | F02C 9/16 |
| | | | 60/783 |
| 2013/0195603 A1 * | 8/2013 | Sheridan | F04D 25/02 |
| | | | 415/1 |
| 2013/0291514 A1 * | 11/2013 | Suciu | F02C 7/06 |
| | | | 60/39.08 |
| 2013/0319798 A1 * | 12/2013 | Sheridan | F01D 25/20 |
| | | | 184/6.11 |
| 2014/0064930 A1 | 3/2014 | NguyenLoc et al. | |
| 2014/0238335 A1 | 8/2014 | Caine et al. | |
| 2015/0089918 A1 | 4/2015 | Valva et al. | |
| 2015/0292359 A1 * | 10/2015 | Ketchum | F01D 21/00 |
| | | | 415/1 |
| 2015/0377066 A1 | 12/2015 | Duong et al. | |
| 2016/0158679 A1 * | 6/2016 | Beier | B01D 45/12 |
| | | | 55/462 |
| 2016/0290240 A1 * | 10/2016 | Libera | F01D 25/20 |
| 2017/0175874 A1 * | 6/2017 | Schwarz | F16H 57/0435 |

* cited by examiner

NEAR ZERO VELOCITY LUBRICATION SYSTEM FOR A TURBINE ENGINE

BACKGROUND OF THE INVENTION

1. Technical Field

This disclosure relates generally to an aircraft propulsion system and, more particularly, to a lubrication system for a turbine engine such as a geared turbofan turbine engine.

2. Background Information

A turbine engine for an aircraft propulsion system typically includes a lubrication system for lubricating one or more of its components. Examples of such lubricated components include bearings, gears, seals, etc. Various types and configurations of lubrication systems are known in the art. While these lubrication systems address various problems, there is still a need in the art for an improved lubrication system for a turbine engine.

SUMMARY OF THE DISCLOSURE

According to an aspect of the present disclosure, a system is provided for a turbine engine. This turbine engine system includes a rotating assembly, a bearing and a lubrication system. The bearing is configured with the rotating assembly. The lubrication system is configured to lubricate the bearing. The lubrication system includes a lubricant pump and a lubricant reservoir. The lubricant pump is mechanically coupled with and driven by the rotating assembly. The lubricant pump is configured with the lubricant reservoir so as to be at least partially submersed in lubricant contained within the lubricant reservoir.

According to another aspect of the present disclosure, another system is provided for a turbine engine. This turbine engine system includes a rotating assembly, a bearing and a lubrication system. The bearing is configured with the rotating assembly. The lubrication system is configured to lubricate the bearing as the rotating assembly rotates at less than about five revolutions per minute (~5 rpm). The lubrication system includes a lubricant pump mechanically coupled with and driven by the rotating assembly.

According to another aspect of the present disclosure, a turbine engine is provided for an aircraft propulsion system. This turbine engine includes a fan rotor, a turbine rotor, a gear system and a lubrication system. The gear system mechanically couples the fan rotor with the turbine rotor. The gear system includes a bearing. The lubrication system is configured to lubricate the bearing. The lubrication system includes a lubricant pump and a lubricant reservoir. The lubricant pump is mechanically coupled with and driven by the gear system. The lubricant pump is configured with the lubricant reservoir so as to gravitationally receive lubricant contained within the lubricant reservoir.

The lubricant pump may be configured with the lubricant reservoir so as to be substantially completely submersed in lubricant contained within the lubricant reservoir.

The lubrication system may include a lubricant reservoir. The lubricant pump may be configured with the lubricant reservoir so as to be at least partially submersed in lubricant contained within the lubricant reservoir.

The lubrication system may be configured to lubricate the bearing as the fan rotor rotates at less than about five revolutions per minute (~5 rpm).

The rotating assembly may include a fan rotor, a compressor rotor and a turbine rotor.

The rotating assembly may also include a gear system mechanically coupled between the fan rotor and the compressor rotor and/or the turbine rotor. The bearing may be configured with the gear system.

The bearing may be configured as or include a journal bearing.

The fan rotor may be operable to windmill. The lubrication system may be configured to lubricate the bearing during the windmilling.

The lubrication system may be configured to lubricate the bearing as the rotating assembly rotates in a first rotational direction. The lubrication system may also or alternatively be configured to lubricate the bearing as the rotating assembly rotates in a second rotational direction.

The lubrication system may be operable to lubricate the bearing where the rotating assembly rotates starting at less than five revolutions per minute (~5 rpm).

The lubrication system may be operable to lubricate the bearing where the rotating assembly rotates at a near zero rotational velocity.

The lubrication system may include a clutch configured to mechanically couple the lubricant pump to the rotating assembly where the rotating assembly rotates at or below a threshold rotational velocity. The clutch may also or alternatively be configured to mechanically decouple the lubricant pump from the rotating assembly where the rotating assembly rotates above the threshold rotational velocity.

The clutch may be a mechanically actuated clutch. Alternatively, the clutch may be an electrically actuated clutch.

The clutch may be configured for mounting with the turbine engine as a line replaceable unit. In addition or alternatively, the lubricant pump may be configured for mounting with the turbine engine as a line replaceable unit.

The lubricant pump may be configured for mounting with the turbine engine as a line replaceable unit.

The lubrication system may include a lubricant flow regulator arranged inline between the lubricant pump and the bearing.

A combustor and a second lubrication system may be included. The second lubrication system may be configured to lubricate the bearing during at least a mode of operation where the combustor is operational. In this mode, the lubrication system may be non-operation and, therefore, not provide lubricate to the bearing. The lubrication system may be configured to lubricate the bearing during at least another mode of operation where the combustor is non-operational. In this other mode, the second lubrication system may be non-operation and, therefore, not provide lubricate to the bearing.

A guide vane and a tower shaft may be included. The tower shaft may extend radially through the guide vane. A gravitational upper end of the tower shaft may be mechanically coupled with the rotating assembly. A gravitational lower end of the tower shaft may be mechanically coupled with the lubricant pump.

The foregoing features and the operation of the invention will become more apparent in light of the following description and the accompanying drawings.

DETAILED DESCRIPTION OF THE INVENTION

Figure 1:
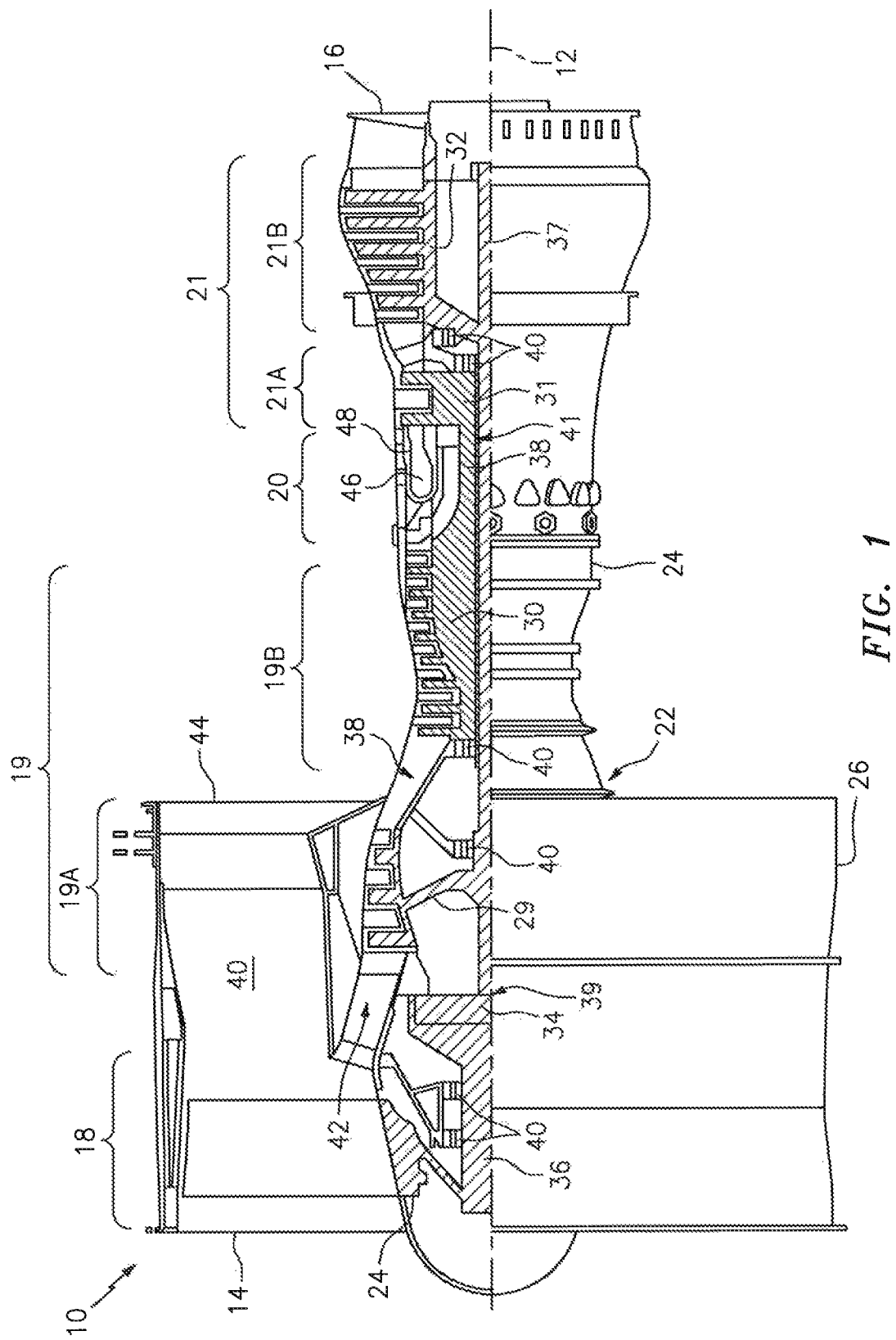
FIG. 1 is a side cutaway illustration of a geared turbine engine.

FIG. 1 is a side cutaway illustration of a geared turbine engine 10, which is configured as a turbofan engine for an aircraft propulsion system. This turbine engine 10 extends along an axial centerline 12 between an upstream airflow inlet 14 and a downstream airflow exhaust 16.

The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

Each of the engine sections 18, 19A, 19B, 21A and 21B includes a respective rotor 28-32. Each of these rotors 28-32 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 28 is mechanically coupled with a gear system 34, for example, through a fan shaft 36, where the gear system 34 may be configured as an epicyclic gear train or otherwise. The gear system 34 and the LPC rotor 29 are mechanically coupled with and driven by the LPT rotor 32 through a low speed shaft 37. The combination of at least the fan rotor 28, the LPC rotor 29, the LPT rotor 32, the gear system 34, the fan shaft 36 and low speed shaft 37 form a first rotating assembly 39. The HPC rotor 30 is mechanically coupled with and driven by the HPT rotor 31 through a high speed shaft 38. The combination of at least the HPC rotor 30, the HPT rotor 31 and high speed shaft 38 form a second rotating assembly 41. The shafts 36-38 are rotatably supported by a plurality of bearings 40; e.g., rolling element and/or thrust bearings. Each of these bearings 40 is connected to the engine housing 22 by at least one stationary structure such as, for example, an annular support strut.

During a first mode of turbine engine 10 operation, air enters the turbine engine 10 through the airflow inlet 14. This air is directed through the fan section 18 and into a core gas path 42 and a bypass gas path 44. The core gas path 42 flows sequentially through the engine sections 19-21. The air within the core gas path 42 may be referred to as "core air". The bypass gas path 44 flows through a duct between the inner case structure 24 and the outer case structure 26. The air within the bypass gas path 44 may be referred to as "bypass air".

The core air is compressed by the compressor rotors 29 and 30 and directed into a combustion chamber 46 of a combustor 48 in the combustor section 20. Fuel is injected into the combustion chamber 46 and mixed with the compressed core air to provide a fuel-air mixture. This fuel air mixture is ignited and combustion products thereof expand and flow through and sequentially cause the turbine rotors 31 and 32 to rotate. The rotation of the turbine rotors 31 and 32 respectively drive rotation of the compressor rotors 30 and 29 and, thus, compression of the air received from the core airflow inlet 14. The rotation of the turbine rotor 32 also drives rotation of the fan rotor 28, which propels bypass air through and out of the bypass gas path 44. The propulsion of the bypass air may account for a majority of thrust generated by the turbine engine 10, e.g., more than seventy-five percent (75%) of engine thrust. The turbine engine 10 of the present disclosure, however, is not limited to the foregoing exemplary thrust ratio.

During a second mode of turbine engine 10 operation, fuel may no longer be injected into and ignited within the combustion chamber 46. Thus, during this second mode, the combustor 48 may be described as being "non-operational". In contrast, in the first mode described above, the combustor 48 may be described as being "operational" where fuel is injected into the combustion chamber 46.

Due to aforementioned fuel cutoff, the turbine rotors 31 and 32 are no longer caused to rotate by expanding combustion products generated by igniting a fuel-air mixture within the combustion chamber 46 as described above. The first and the second rotating assemblies 39 and 41 therefore may become rotationally stationary. Typically, the turbine engine 10 will be placed in this second mode when parked at an airport or in an airplane hangar.

Under certain conditions, forces external to the turbine engine 10 may cause at least the first rotating assembly 39 (e.g., components 28, 29, 32, 34, 36 and 37) to rotate during the second mode. For example, a headwind may enter the turbine engine 10 through the airflow inlet 14 and cause the fan rotor 28 to rotate in a first rotational direction (e.g., a counter-clockwise direction). In another example, a tailwind may enter the turbine engine 10 through the bypass gas path 44 and cause the fan rotor 28 to rotate in a second rotational direction (e.g., a clockwise direction), which is opposite the first direction. Such first or second direction fan rotor 28 rotation may be generally referred to as "windmilling".

Figure 2:
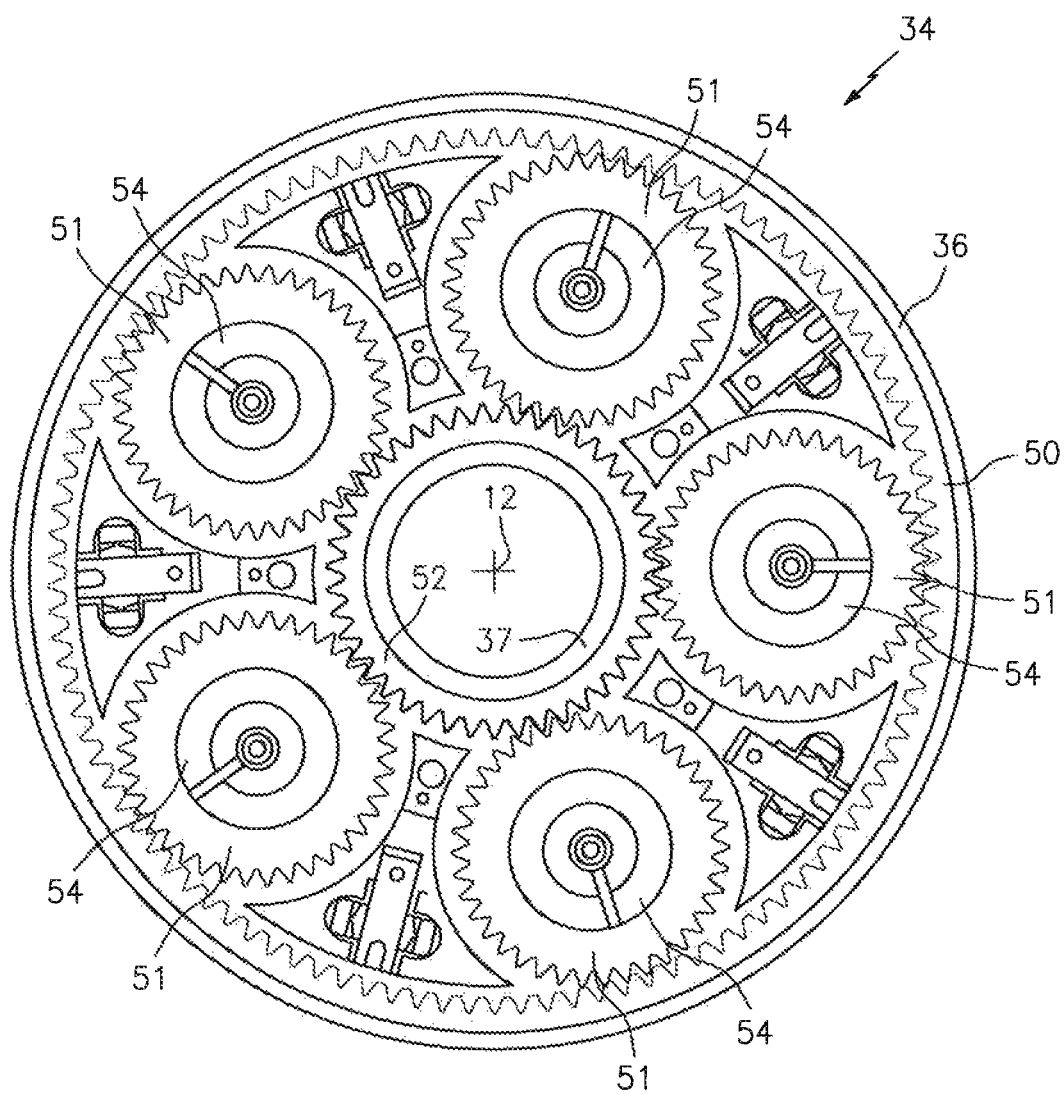
FIG. 2 is a cross-sectional illustration of a gear system for the turbine engine.

During windmilling, rotation of the fan rotor 28 causes corresponding rotation of the LPC rotor 29 and the LPT rotor 32 and, thus, one or more internal components of the gear system 34. Referring to FIG. 2, examples of such internal components include, but are not limited to a ring gear 50, planetary gears 51 and a sun gear 52. The ring gear 50 may be attached to the fan shaft 36. Each of the planetary gears 51 may be supported by a respective bearing 54 such as a journal bearing; however, other types of bearing configurations are contemplated by the present disclosure. The sin gear 52 may be attached to the low speed shaft 37.

It may be desirable to lubricate one or more turbine engine components, such as one or more of the bearings 54, during windmilling in order to reduce or prevent wear thereto. However, a typical primary lubrication system for a turbine engine utilizes a mechanical lubricant pump mounted to an accessory gearbox. This accessory gearbox is typically mechanically coupled to and driven by a rotating assembly which includes a HPC rotor and a HPT rotor. These HPC and HPT rotors are typically rotationally stationary in modes where a fan rotor is windmilling for similar reasons as set forth above. Therefore, the mechanical lubricant pump of the primary lubrication system may be incapable of pumping lubricant during windmilling. Furthermore, even where the mechanical lubricant pump is driven by the rotating assembly during windmilling or another means, such a lubricant pump typically utilizes suction to draw lubricant through a conduit from a lubricant reservoir to the pump. Thus, such a lubricant pump must be driven at a relatively high rotational velocity in order to generate enough suction to draw the lubricant out of the reservoir and through the conduit. Driving the lubricant pump at a relatively high rotational velocity may be difficult or impossible in low wind speed conditions where the wind is utilized to power the pump.

Figure 3:
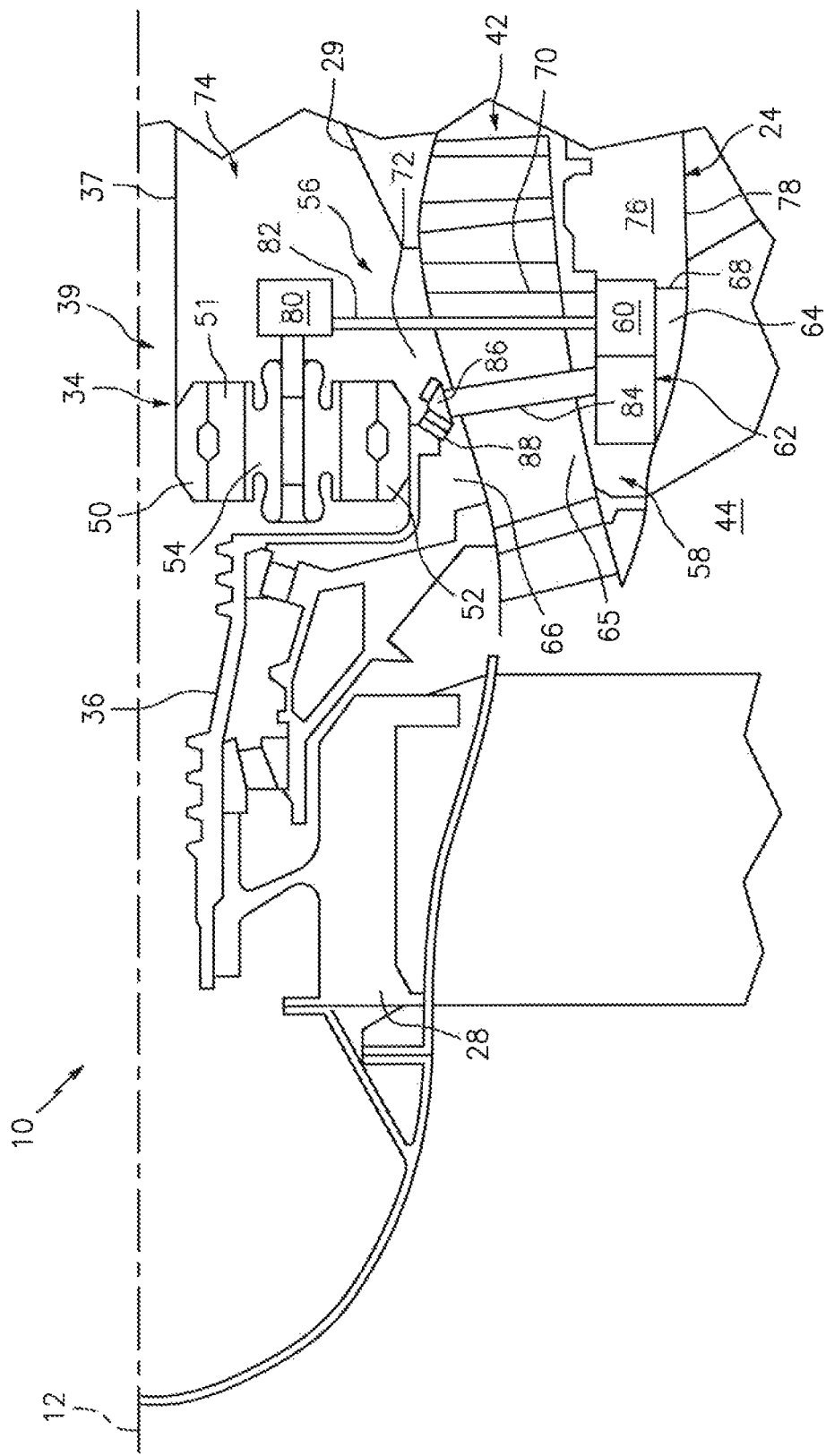
FIG. 3 is a schematic diagram of a lubrication system configured with the turbine engine.

In order to lubricate one or more of the bearings 54 during windmilling and/or other conditions modes, the turbine engine 10 of the present disclosure includes a lubrication system 56 as shown in FIG. 3. This lubrication system 56 may be configured as a supplemental lubrication system as described below in further detail; however, the present disclosure is not limited to such a "supplemental" configuration.

The lubrication system 56 may be configured to lubricate the bearings 54 even where one or more of the components 28, 29, 32, 34, 36 and 37 of the first rotating assembly 39 rotate at rotational velocities near zero. Herein, the term "near zero" may describe a rotational velocity that is just slightly above a zero (0) rotational velocity such as, for example, a rotational velocity of less than about five revolutions per minute (RPM). The present disclosure, of course, is not limited to such a near zero operational configuration.

Figure 4:
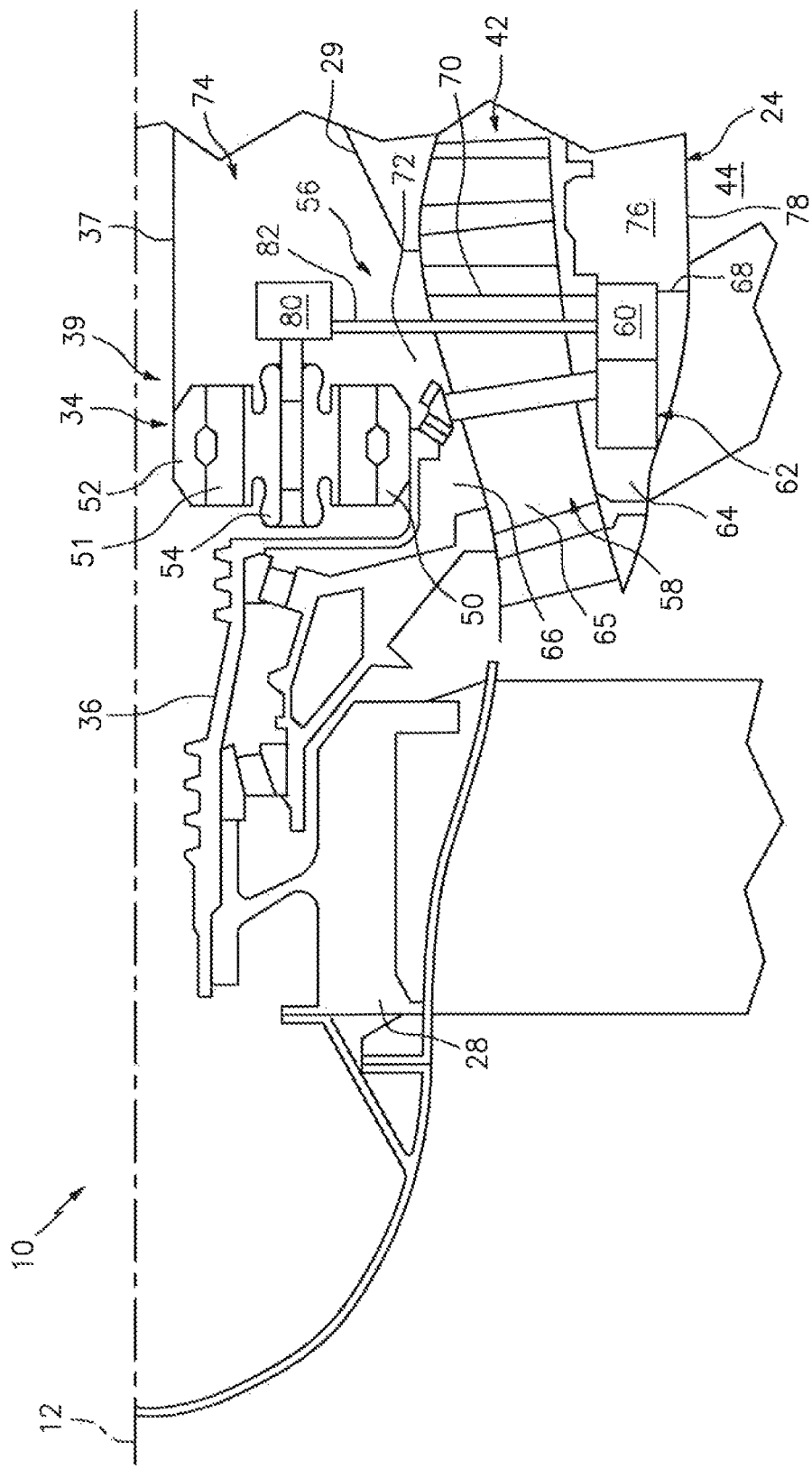
FIG. 4 is another schematic diagram of the lubrication system configured with the turbine engine, where a lubricant reservoir for the lubrication system is filled with lubricant.

The lubrication system 56 of FIG. 3 includes a lubricant reservoir 58, a lubricant pump 60 and a coupling assembly 62 (or device). The lubricant reservoir 58 may be a discrete container. In addition or alternatively, the lubricant reservoir 58 may be formed by one or more other components of the turbine engine 10. For example, as illustrated in FIGS. 3 and 4, the lubricant reservoir 58 is formed by one or more fluidly interconnected cavities 64-66 within other turbine engine components, which cavities may include chambers, passages, etc. The first cavity 64 is formed by and within a discrete portion 68 of the inner case structure 24. The second cavity 65 is formed by and within a hollow stator guide vane 70, which extends radially across the core gas path 42. The third cavity 66 is formed by and within a discrete portion 72 of a center body structure 74 of the turbine engine 10.

The lubrication reservoir 58 of FIG. 3 is configured to contain a quantity of lubricant (see shaded region in FIG. 4). The lubricant reservoir 58 is sized such that the quantity of lubricant may fill the lubricant reservoir 58 to a lubricant level during the second mode (see FIG. 4). The lubricant reservoir 58 is also arranged in a gravitational lower region of the turbine engine 10. The lubricant reservoir 58 of FIG. 3, for example, is located gravitationally below the gear system 34. The lubricant reservoir 58 may also be located in a readably accessible region of the turbine engine 10; e.g., a region where a technician may have access while the turbine engine 10 remains attached to the aircraft and/or while the aircraft remains on the runway. In FIG. 3, for example, the bottom portion of the lubricant reservoir 58 is located adjacent an area 76 which may become exposed and accessible to a technician by removal of a panel 78 of the inner case structure 24. Of course, the present disclosure is not limited to the foregoing exemplary lubricant reservoir 58 configuration or location.

Figure 5:
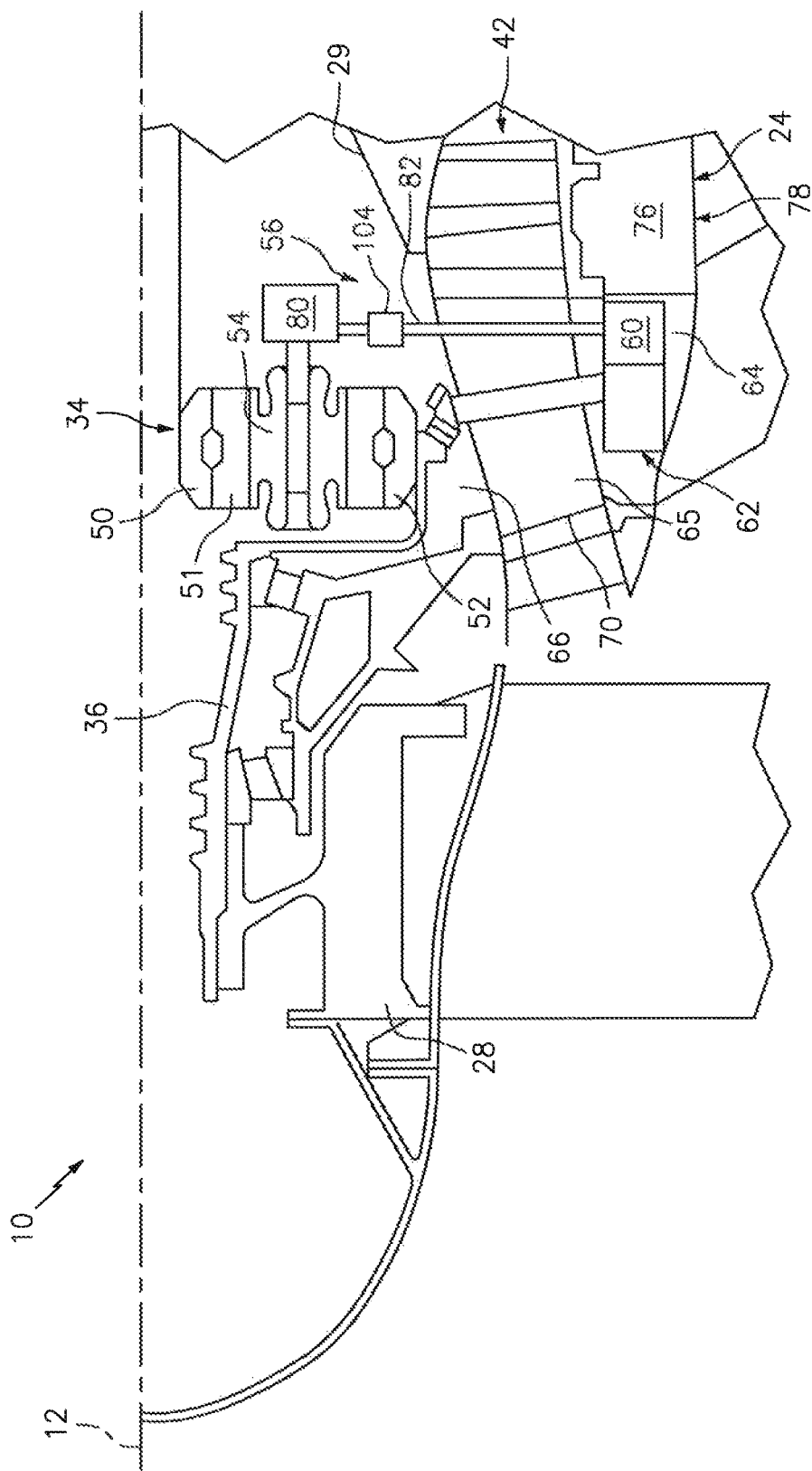
FIG. 5 is a schematic diagram of another lubrication system configured with the turbine engine.

The lubricant pump 60 is a mechanical pump such as, but not limited to, a geared pump with constant direction gearing. The lubricant pump 60 is configured with the lubricant reservoir 58. In particular, the lubricant pump 60 of FIG. 4 is mounted to a sidewall of the inner case structure 24 which partially forms the cavity 64. In this location, the lubricant pump 60 is at least partially submersed within the lubricant contained in the lubricant reservoir 58. Of course, in other embodiments, the lubricant pump 60 may be fully submersed within the lubricant contained in the lubricant reservoir 58 as illustrated in FIG. 5. With these arrangements, the lubricant pump 60 may gravitationally receive the lubricant contained in the lubricant reservoir 58; e.g., gravity may force the lubricant to the pump 60.

By maintaining the lubricant pump 60 at least partially submersed within the lubricant, the lubricant pump 60 may remain primed even where the pump 60 is non-operation. For example, the lubricant may remain within the lubricant pump 60 even where the pump 60 is not pumping the lubricant to the bearings 54. In contrast, where a pump is located outside of a reservoir, gravity may cause lubricant to flow backwards out of the pump and back to the reservoir where that pump is non-operation. Furthermore, the lubricant pump 60 of FIG. 4 does not need to generate a minimum suction force to draw the lubricant therein since the pump 60 is arranged within the lubricant. In contrast, where a pump is located outside of a reservoir or above lubricant within the reservoir, that pump must generate a minimum suction force to draw lubricant from the reservoir to the pump as described above.

Referring now to FIG. 3, the lubricant pump 60 may be further configured as a line replaceable unit. Herein, the term "line replaceable unit" may describe a component of the turbine engine 10 which may be replaced by a technician while the airplane is parked on the runway (or within a hangar) without requiring detaching the turbine engine 10 from the airplane. For example, the lubricant pump 60 of FIG. 3 is configured to be accessible to a technician through the area 76 which may become exposed and accessible by removal of the panel 78. Of course, in other embodiments, the lubricant pump 60 may have alternative configurations where, for example, the pump 60 is located in the center body structure 74 and, thus, may not be a line replaceable unit.

An outlet of the lubricant pump 60 may be fluidly coupled with a manifold structure 80 through a lubricant conduit 82, where the manifold structure 80 is configured to provide lubricant to the bearings 54. In this manner, the lubricant pump 60 is operable to pump lubricant from the lubricant reservoir 58 to the bearings 54 for lubricating those bearings 54.

The coupling assembly 62 is configured to mechanically couple the first rotating assembly 39 to the lubricant pump 60. The coupling assembly 62 of FIG. 3, for example, is configured to mechanically couple a component of the gear system 34 to the lubricant pump 60. In particular, this coupling assembly 62 includes a tower shaft 84 and a bevel gear 86, which is meshed with a bevel gear 88 configured with the ring gear 52. The tower shaft 84 extends radially through the cavity of the guide vane 70 between a gravitational upper end and a gravitational lower end. The upper end is connected to the bevel gear 86. The lower end is mechanically coupled (directly or indirectly) to the lubricant pump 60.

Figure 6:
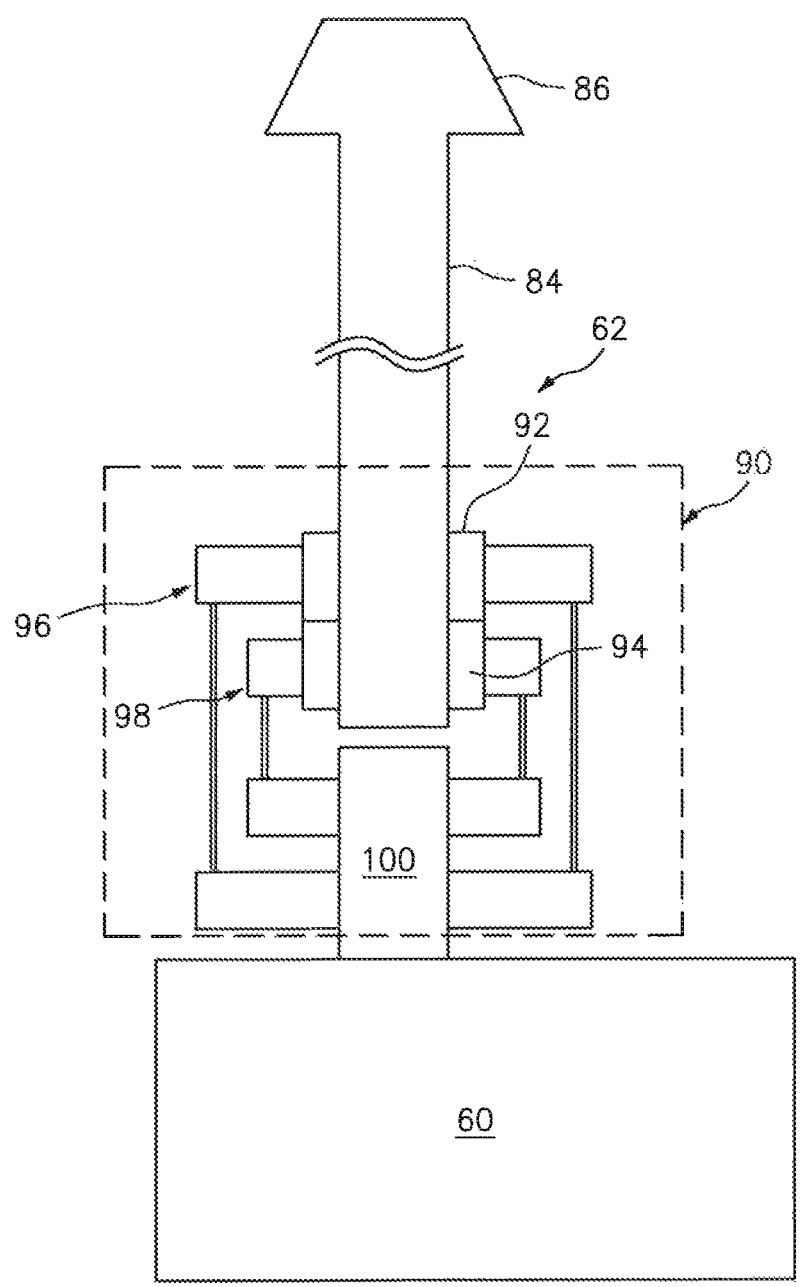
FIG. 6 is a block diagram of a coupling system connected with a lubricant pump for the lubrication system.

Referring to FIG. 6, to facilitate operation of the lubricant pump 60 where the first rotating assembly 39 may rotate in both first and second directions, the coupling assembly 62 may include or be configured with a transmission 90. This transmission 90 may include one or more clutches and/or one or more sets of gearing. For example, the transmission 90 of FIG. 6 includes a set of first and second clutches 92 and 94 and associated first and second sets of gearing 96 and 98. The first clutch 92 (e.g., a Sprag type clutch) is configured to mechanically couple the tower shaft 84 to an input shaft 100 of the lubricant pump 60 through the first set of gearing 96, where the first rotating assembly 39 is rotating in a first rotational direction. The second clutch 94 (e.g., a Sprag type clutch) is configured to mechanically couple the tower shaft 84 to the input shaft 100 through the second set of gearing 98, where the first rotating assembly 39 is rotating in a second rotational direction opposite the first rotational direction. Of course, in other embodiments, one or more of the clutches 92 and 94 may be combined into a single bidirectional clutch or replaced by one or more other types of clutches.

Figure 7:
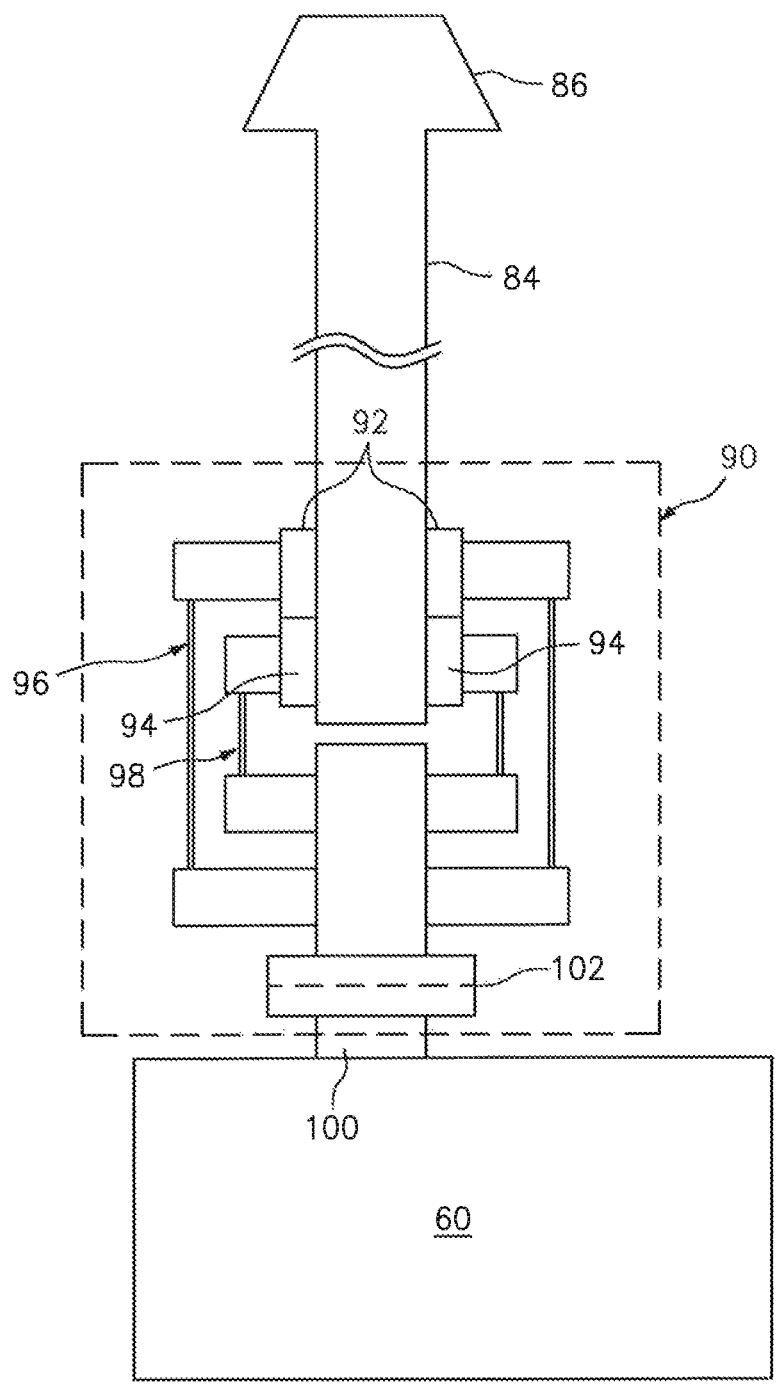
FIG. 7 is a block diagram of another coupling system connected with the lubricant pump for the lubrication system.

In some embodiments, referring to FIG. 7, the transmission 90 may also or include an additional clutch 102. This additional clutch 102 is configured to mechanically couple the first rotating assembly 39 and, for example, tower shaft 84 in particular to the lubricant pump 60 where the first rotating assembly 39 rotates at or below a threshold rotational velocity. The additional clutch 102 is also configured to mechanically decouple the first rotating assembly 39 and, for example, tower shaft 84 in particular from the lubricant pump 60 where the first rotating assembly 39 rotates above the threshold rotational velocity. This threshold rotational velocity may be selected to correspond to a point during, for example, turbine engine 10 startup and/or low speed turbine engine 10 operation where a primary lubrication system driven by an accessory gearbox becomes operational and, thus, the lubrication system 56 is no longer needed for lubricating the bearings 54. For example, the threshold rotational velocity may fall within a range between ground idle speed and about two times ground idle speed; however, the threshold rotational velocity of the present disclosure is not limited thereto.

In some embodiments, the additional clutch 102 may be an electrically actuated clutch. In other embodiments, the additional clutch 102 may be a mechanically actuated clutch.

In some embodiments, the lubrication system 56 may be configured without the transmission 90.

In some embodiments, the lubrication system 56 may include at least one fluid regulator 104 as shown in FIG. 5. This fluid regulator 104 may be configured inline between the lubricant pump 60 and the bearing 54. The fluid regulator 104, for example, may be configured inline with the conduit 82. An example of such a fluid regulator a pressure relief valve; however, the fluid regulator 104 of the present disclosure is not limited to such a configuration.

In some embodiments, the lubrication system 56 may also or alternatively be configured to lubricant turbine engine components other than the bearings 54. For example, the lubrication system 56 may lubricate one or more of the bearings 40 (see FIG. 1). In another example, the lubrication system 56 may lubricant one or more of the gears 50-52 (see FIG. 2), etc.

In some embodiments, the coupling assembly 62 may mechanically couple the lubricant pump 60 to another component of the first rotating assembly 39. For example, the coupling assembly 62 may mechanically couple the lubricant pump 60 to one of the rotors 28, 29 or 32 or one of the shafts 36 or 37.

The lubrication system 56 may be included in various turbine engines other than the one described above. The lubrication system 56, for example, may be included in a geared turbine engine where a gear train connects one or more shafts to one or more rotors in a fan section, a compressor section and/or any other engine section. Alternatively, the lubrication system 56 may be included in a turbine engine configured without a gear train. The lubrication system 56 may be included in a geared or non-geared turbine engine configured with a single spool, with two spools (e.g., see FIG. 1), or with more than two spools. The turbine engine may be configured as a turbofan engine, a turbojet engine, a propfan engine, a pusher fan engine or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A system for a turbine engine, comprising:
a rotating assembly including a fan rotor, a compressor rotor, a turbine rotor and a gear system, the gear system mechanically coupled between the fan rotor and the turbine rotor;
a bearing configured with the gear system;
a lubrication system configured to lubricate the bearing, the lubrication system comprising a lubricant pump and a lubricant reservoir;
a guide vane; and
a tower shaft extending radially through the guide vane, a first end of the tower shaft mechanically coupled with the gear system, and a second end of the tower shaft mechanically coupled with the lubricant pump;
wherein the lubricant pump is configured with the lubricant reservoir so as to be at least partially submersed in lubricant contained within the lubricant reservoir, and wherein a sidewall of the lubricant reservoir forms an outer peripheral boundary of a core gas path within the turbine engine.

2. The system of claim 1, wherein the bearing comprises a journal bearing.

3. The system of claim 1, wherein the fan rotor is operable to windmill, and the lubrication system is configured to lubricate the bearing during the windmilling.

4. The system of claim 1, wherein the lubrication system is configured to lubricate the bearing as the rotating assembly rotates in a first rotational direction and a second rotational direction.

5. The system of claim 1, wherein the lubrication system is operable to lubricate the bearing where the rotating assembly rotates at less than about five revolutions per minute.

6. The system of claim 1, wherein the lubrication system further includes a clutch configured to:
mechanically couple the lubricant pump to the tower shaft where the rotating assembly rotates at or below a threshold rotational velocity; and
mechanically decouple the lubricant pump from the tower shaft where the rotating assembly rotates above the threshold rotational velocity.

7. The system of claim 6, wherein the clutch is a mechanically actuated clutch.

8. The system of claim 6, wherein the clutch is an electrically actuated clutch.

9. The system of claim 6, wherein the clutch is configured for mounting with the turbine engine as a line replaceable unit.

10. The system of claim 1, wherein the lubricant pump is configured for mounting with the turbine engine as a line replaceable unit.

11. The system of claim 1, wherein the lubrication system further includes a lubricant flow regulator arranged inline between the lubricant pump and the bearing.

12. The system of claim 1, further comprising:
a combustor; and
a second lubrication system configured to lubricate the bearing during at least a mode of operation where the combustor is operational;
wherein the lubrication system is configured to lubricate the bearing during at least another mode of operation where the combustor is non-operational.

13. The system of claim 1, wherein the first end of the tower shaft is a gravitational upper end of the tower shaft, and the second end of the tower shaft is a gravitational lower end of the tower shaft.

14. The system of claim 1, wherein
the gear system comprises a ring gear; and
the first end of the tower shaft is mechanically coupled with the ring gear.

15. The system of claim 1, further comprising:
a first bevel gear mounted to the tower shaft at the first end of the tower shaft; and
a second bevel gear mounted to the gear system and meshed with the first bevel gear.

16. The system of claim 1, wherein the second end of the tower shaft is within the lubricant reservoir.

17. A system for a turbine engine, comprising:
a rotating assembly including a fan rotor, a compressor rotor, a turbine rotor and a gear system, the gear system mechanically coupled between the fan rotor and the turbine rotor;
a bearing configured with the gear system;
a lubrication system configured to lubricate the bearing as the rotating assembly rotates at less than about five revolutions per minute, the lubrication system including a lubricant pump and a lubricant reservoir;
a guide vane; and
a tower shaft extending through the guide vane and between a first end and a second end, the first end mechanically coupled with the gear system, and the second end mechanically coupled with the lubricant pump;
wherein the lubricant pump is configured with the lubricant reservoir so as to be at least partially submersed in lubricant contained within the lubricant reservoir.

18. A system for a turbine engine, comprising:
a rotating assembly including a fan rotor, a compressor rotor, a turbine rotor and a gear system, the gear system mechanically coupled between the fan rotor and the turbine rotor;
a bearing rotatably supporting a component of the gear system;
a lubrication system configured to lubricate the bearing, the lubrication system comprising a lubricant pump and a lubricant reservoir;
a guide vane; and
a tower shaft extending through the guide vane and between a first shaft end and a second shaft end, the first shaft end mechanically coupled with the gear system at the first shaft end, and a second shaft end mechanically coupled with the lubricant pump;
wherein the lubricant pump is configured with the lubricant reservoir so as to be at least partially submersed in lubricant contained within the lubricant reservoir.

19. The system of claim 18, wherein
the gear system comprises a ring gear; and
the first shaft end is mechanically coupled with the ring gear.

20. The system of claim 18, further comprising:
a first bevel gear mounted to the tower shaft at the first shaft end; and
a second bevel gear mounted to the gear system and meshed with the first bevel gear.

* * * * *